March 31, 1959 M. WÄCHTLER 2,880,415
DIRECTION FINDER WITH VISUAL INDICATION
Filed March 16, 1954 3 Sheets-Sheet 3
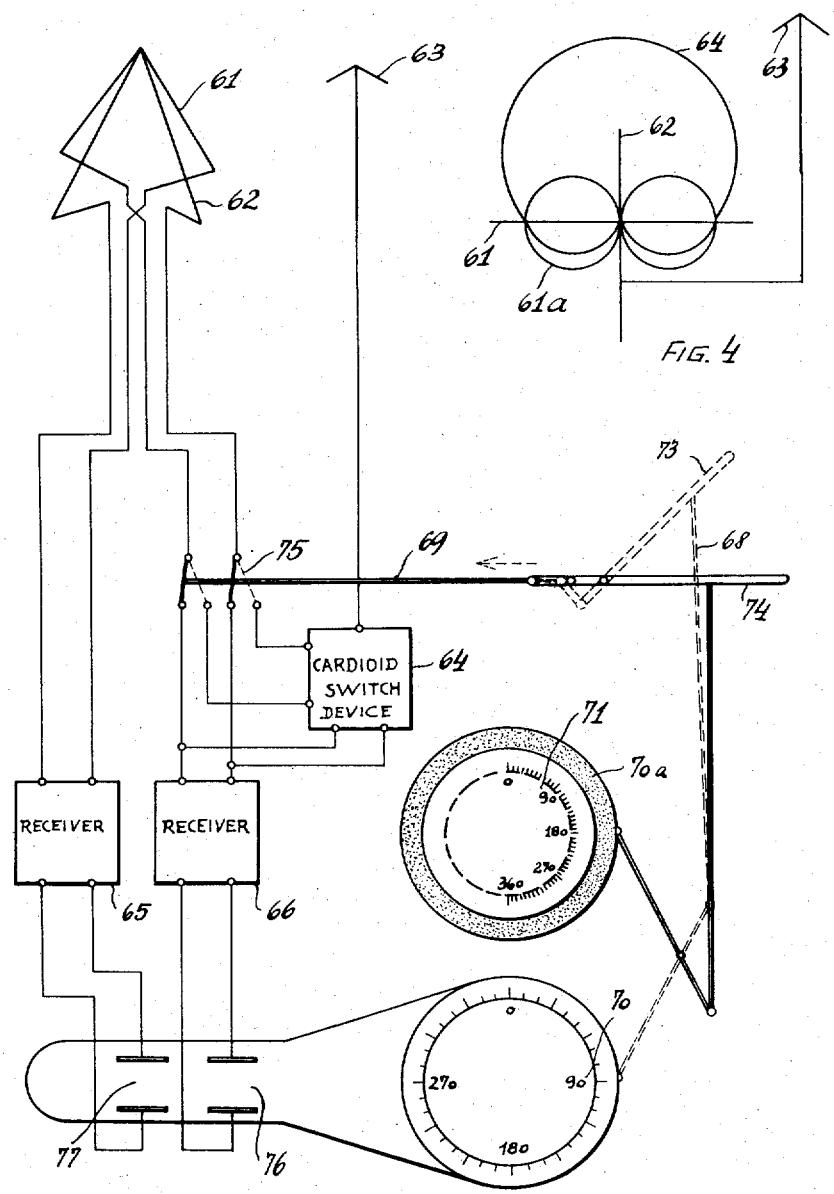
INVENTOR.
MAXIMILIAN WÄCHTLER
BY Mestern & Kollin
ATTORNEYS

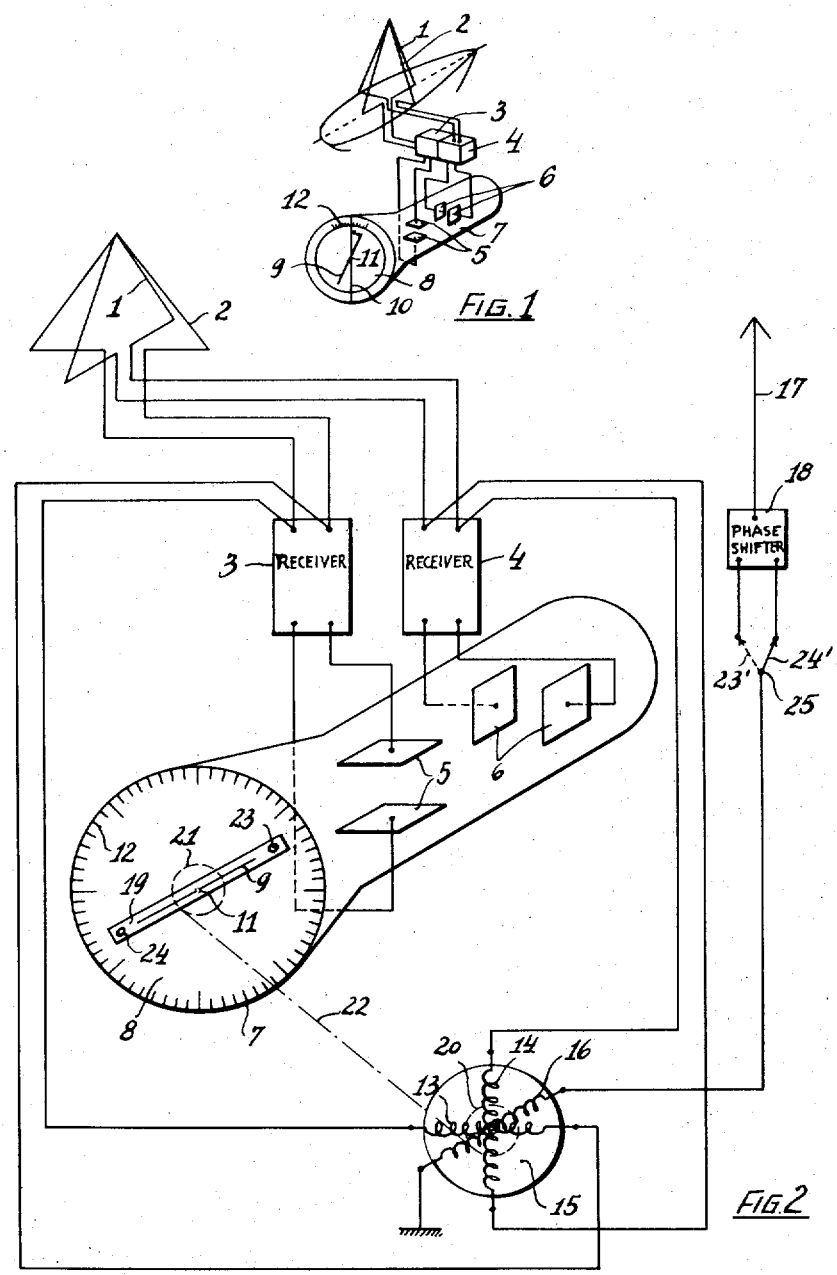

2,880,415

DIRECTION FINDER WITH VISUAL INDICATION

Maximilian Wächtler, Sierksdorf, Post, Haffkrug, Holstein, Germany

Application March 16, 1954, Serial No. 416,618

Claims priority, application Germany March 23, 1953

21 Claims. (Cl. 343—113)

This invention relates to a cathode-ray type radio direction finder comprising two directional antennas, a non-directional auxiliary antenna, two substantially equal receivers, a cathode-ray tube with two pairs of deflecting plates arranged at right angles, and a manually rotatable pointer for scale reading. The invention makes use of a goniometer that is provided for sense determination. The resolver search coil (or plate in a capacitive goniometer) is coupled with the cursor in such a way that the search coil and the cursor are always rotated through the same angle, and the search coil furthermore causes the auxiliary antenna voltage to be blended into the visual indication for the purpose of sense determination. The non-directional auxiliary antenna is connected through a change-over switch either in phase or phase opposition with the phase of the loop voltage and the resolver field coils (or plates in a capacitive resolver) are connected to the crossed loops in such a way that the components of the auxiliary antenna are superimposed on the components of the loop voltage, thus effecting a lengthening or shortening of the indication line, whereby the sense determination is rendered possible.

According to the invention, the resolver may by means of a switching device be used either as a sense determining apparatus for the visual indication for coupling the auxiliary antenna voltage with the loop voltage, or in case of failure of the indication device, as a bearing resolver for direction finding on the minimum method; in the latter case its field coils are usually connected with the two loop aerials and its search coil with one or the other receiver. In this case additional switching equipment for realizing the coupling of the auxiliary antenna voltage for compensation of quadrature effect and sense determination may be provided in the well known manner which equipment may be connected with each of the two receivers.

Furthermore the pointer for facilitating the scale reading of disturbed indications suitably contains several lines parallel to the reading line.

Moreover, according to the invention, a mechanical or electromechanical switching device may be provided by means of which after switching in the direction finder, first a position for calibration is obtained in order to test or correct respectively the equal amplification of both channels as to phase and amplitude, before the direction finder is operated by switching to the position "bearing."

The abbreviation D.F. is hereafter used for direction finder throughout this specification. In the bearing position the devices for correction and tuning should be blocked in a way as only to become effective again by switching back to the position "calibration."

According to the invention, further measures are proposed which prevent bearings to be obtained if the D.F. has not been operated correspondent with the working instruction.

The invention furthermore relates to two proposals for sense determination. The first consists in the extinction of the wrong side without application of a third amplifying channel, the second realizes the sense determination by applying a special combination of directive aerials instead of the directive antenna used for taking the bearing.

In a direction finder with visual indication mainly based on the twin-channel principle (Watson-Watt) it is required for obtaining correct bearings to realize perfectly equal amplification of both amplifying channels as to phase and amplitude.

For this purpose the D.F. may be calibrated before a bearing is taken, as follows: A definite voltage e.g. coming from a test oscillator or from the aerials which voltage is in a suitable way taken either from the auxiliary aerial or from the loops, is fed to the inputs of the two amplifiers which are connected in parallel. If the two channels are perfectly equal, a control indication as a luminous line under 45° will appear on the cathode-ray tube which is provided for indication. The abbreviation C.R. will be used hereafter for cathode-ray throughout this specification.

If the two channels are not equal, the luminous line will be rotated off the 45°-position if the amplitudes differ from each other and it will be split into an ellipse if there is a difference in phase. If such like control indications appear, it has to be effected by two correction knobs (for phase and amplitude) that the calibration indication is put in the 45°-position as a luminous line. Then the position "bearing" is switched in by which action the crossed loops are connected to the inputs of the two amplifiers, as it is required for taking a bearing; each loop is connected to one of the channels. The then obtained bearing is the correct bearing in any case; bearing errors caused by propagation phenomena, e.g. by night effect, are disregarded here.

In order to ensure that the bearing can in no case be obtained before the position "calibration" is switched in, the invention provides that the apparatus after switching in automatically is in that position and that the tuning and the knobs for correction of phase and amplitudes may be operated only in the position "calibration."

If it is then switched from the position "calibration" to "bearing" a blocking mechanism according to the invention effects that the devices for tuning and correction are blocked, the indication obtained in the position "bearing" is thus no longer changeable and is correct in any case, provided that the apparatus has been operated as required by the working instruction, i.e. that the control indication as a luminous line under 45° has actually been adjusted in the position "calibration" which is automatically switched in before the position "bearing."

If the apparatus has not been operated according to the working instruction and the 45°-line has not been controlled in the position "calibration," it is according to the invention furthermore effected that in order to avoid bearing errors in the position "bearing" no indication at all will appear or may be read or that the switching from the position "calibration" to the position "bearing" is rendered impossible by blocking the switch.

These measures may e.g. be realized by means of a photocell which proves that the luminous line appears under 45°. If the line is not exactly in this 45°-position, suitable mechanical or electro-mechanical means may be provided which effect the disappearance of the bearing indication at switching from "calibration" to "bearing" (e.g. by means of an extinction device provided by the Wehnelt-cylinder or by breaking the power supply) or the disappearance of the scale from which the bearing is read, or the blocking of the switch used for switching from "calibration" to "bearing."

The mentioned measures for preventing an incorrect operation may also be directly controlled by suitable bridge circuits which realize the equal amplification of the two amplifying channels.

The invention also includes a further possibility for sense determination; the bearing indication is made unilateral by the measure that the wrong sense is extinguished by darkening one half of the indication line; the sense indication is thus realized correspondent with the application of the third channel for the auxiliary antenna. The invention, however, does not apply a third channel for the auxiliary antenna but a resolver the search coil of which is coupled with the pointer for scale reading by mechanical means.

For the further measure according to the invention the resolver is not arranged as explained for the first method effecting the sense determination by lengthening or shortening of the bearing indication, but in the usual way as in minimum D.F., i.e. the inputs of the field coils (or field plates in a capacitive goniometer) are connected with the outputs of the antenna system (e.g. with the outputs of the two loops). In order to simplify the following explanations, they only relate to an inductive resolver, but are in an analogous way valid for a capacitive one, too. For sense determination only the resolver is put between the crossed loops and the inputs of the receivers, whereas for taking the bearing the crossed loops are directly connected to the inputs of the receivers. By adjusting the pointer for scale reading to the direction of the luminous line, the search coil of the resolver which is coupled with the pointer by mechanical means, is put in a position in which it has optimum coupling with the vector which results from the components furnished by the field coils of the resolver. If in this position the search coil is connected with the receiver input, the direction of the luminous line remains the same with relation to a second scale, having a fixed connection with the pointer and consequently with the search coil, as it was before the interconnection of the resolver with relation to the usual bearing scale.

The second receiver may now otherwise be disposed of; according to the invention it is used for the amplification of the voltage coming from the auxiliary aerial which voltage after suitable matching as to phase and amplitude to the voltage coming from the crossed loops, is fed to the Wehnelt-cylinder of the C.R. tube and thus effects the extinction of the wrong side of the luminous line.

The sense is thus obtained in the same way as by application of a third channel for the extinction. The resolver has only to rotate the antenna system by electrical means in a way that one loop is rotated into the direction of the incident wave which in the normal bearing position (still ambiguous) was determined in the usual way. In the same way as the electric rotation of the crossed loops is effected by means of the resolver, the crossed loops may also be directly rotated by merely mechanical means without interconnection of a resolver.

A further measure according to the invention consists in providing an antenna combination for sense determination by which combination one receiver gets a figure-eight-pattern and the other a heart-shaped characteristic. It is useful to place the minimum which is the same for both characteristics in a way as to allow interfering transmitters, especially re-radiators, to be eliminated.

Correspondent with the invention, the figure-eight-characteristic produced by the two crossed loops and used for taking a bearing, is for sense determination changed over to a characteristic which has the property that for a rotation of 360° of the object to be found, the luminous line only runs about 180°. Contary to the usual 360° scale, a scale results which contains the 360° on a semicircle which normally only consists of 180°.

For this purpose the scale required for the sense determining circuit, is suitably provided instead of the bearing scale by electrical or mechanical means at switching from "bearing" to "sense determination." According to the different scales the luminous indication will also be rotated into another direction at switching from "bearing" to "sense determination."

In the accompanying drawings several preferred embodiments of the invention are shown by way of illustration and not by way of limitation.

Fig. 1 is a schematic diagram of a radio D.F. with visual indication,

Fig. 2 is a circuit diagram for sense determination by means of the change in length of the bearing indication, Fig. 4 is a directional pattern for application of an antenna combination with figure-eight-pattern and heart-shaped pattern, and Fig. 5 is a circuit diagram for the latter case.

Figure 3:
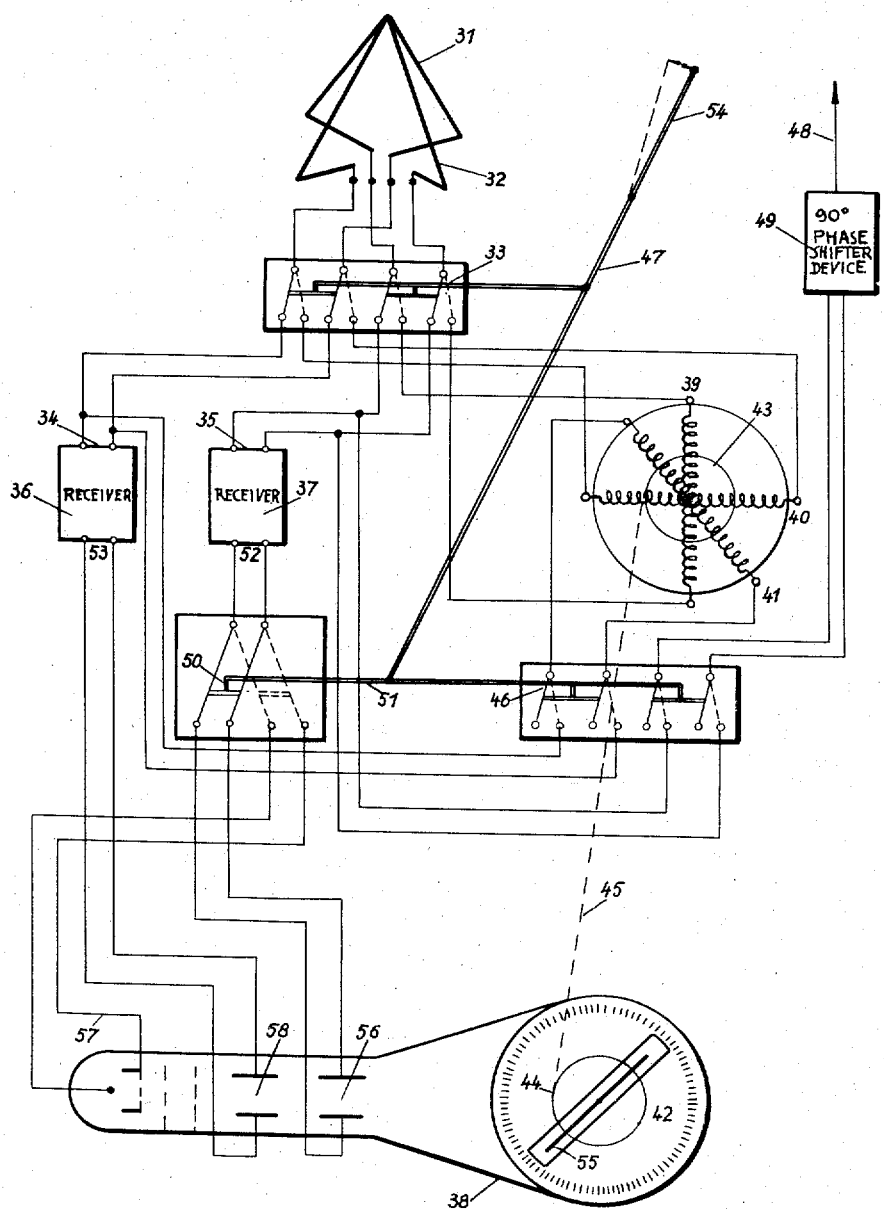
Fig. 3 is a circuit diagram for extinction of the wrong sense.

The mode of operation of a direction finder with visual indication on the principle of Watson-Watt on which the invention is based, is represented by Fig. 1. From two crossed loops one plane 1 of which is arranged fore and aft and the other 2 athwartship, the voltages are fed to two equal receivers 3 and 4 and after amplification sufficient for the deflection of the luminous point on the screen 8 of the C.R. tube 7, they are fed to the pairs of deflecting plates 5 and 6 of the C.R. tube.

If a wave is incident with the angle $\alpha$ referred to the fore-and-aft line of the ship, a resulting luminous line 9 will be obtained, i.e. the bearing indication, which also includes the angle $\alpha$ with the zero direction 10 of the screen 8 of the C.R. tube 7.

The thus obtained indication being a luminous line 9 through the centre 11 of the screen 8, is ambiguous. Just as in a minimum D.F. the sense determination must now be carried out by means of an undirectional antenna, i.e. the indication must become unilateral.

For this purpose a method is known in which by means of a third amplifying channel the auxiliary antenna voltage is fed to the Wehnelt-cylinder of a C.R. tube in order to extinguish one half of the luminous diameter, thus resulting in only a luminous radius as unilateral indication, without requiring additional operation for sense determination. But besides the considerable increase of technical expenditure for the third channel, still increasing by special arrangements for ensuring the amplification as to phase and amplitude in that channel to be the same as in the two other ones, a further disadvantage is caused by the fact that the accuracy of bearing at very low intensities of field in which case the length of the indication is rather short, is further reduced by the fact that due to the extinction the indication line is diminished to half of its length.

According to the invention, the sense determination is carried out by a special operation after having taken the bearing; by two switch positions (e.g. red and blue) a longer and a shorter indication line are produced. Correspondent with the minimum D.F. the correct sense is determined from the respective color of the pointer (red and blue) over the scale 12 of the screen 8.

Furthermore it is made use of the knowledge that it is impossible to read the bearing indication as a luminous line directly from the 360°-scale. At the bearing indications which greatly differ from one another owing to the conditions under which the measurements are taken and show all forms between a sharp diameter over the whole screen and a line being only a few millimeters in length and nearly the same in width, but being distinctly to be observed in its direction, the direction of the luminous line has to be read from the scale by means of a line that is engraved on a rotating pointer. This pointer is adjusted by hand to the direction of the indicated bearing, e.g. by means of a special knob.

In conformity with the invention, this rotating pointer is coupled with the search coil or plate respectively of a resolver to which the auxiliary antenna voltage is fed after phase coincidence with the loop voltage has been realized by electrical means. The field coils or plates respectively of the resolver (as well as the two loops) are connected with the inputs of the two amplifiers of the direction finder with visual indication. Thus it can be realized that the auxiliary voltage is split into a cosine and a sine component which are then superposed on the cosine and sine components coming from the loops, and this super-position effects the resulting indication line to be lengthened or shortened by the auxiliary voltage, depending on the phase in which it is coupled to the resolver search coil or plate at the two switch positions (red and blue). Directly at the scale the rotating pointer has a red mark at its one end and a blue mark at its other end.

The sense is determined as follows: A switch 25 is put in the position 23' (for example "red") and immediately afterwards in the position 24' (for example "blue") and the bearing is then read from that part of the scale where the colour (red or blue) of the mark 23 or 24 on the pointer is the same as that of the switch position 23' or 24' for which the indication is lengthened. If the indication line is e.g. longer in the position "red" of the switch for sense determination than in the position "blue," the correct bearing has to be read from the scale at the mark "red" of the pointer. As the visual D.F. is a maximum D.F., the lengthening of the indication line is consequently applied to the definition of the correct sense; that is in analogy to the minimum D.F. where the colour for the position "low" is used for the correct sense.

In Fig. 2 this arrangement is represented in a schematic form.

The inputs of the receivers 3 and 4 to which the voltages of the loops 1 and 2 are fed, are connected with the field coils 13 and 14 of the resolver 15. The search coil 16 of the resolver 15 gets the voltage furnished by the auxiliary antenna 17, after the phase of the auxiliary voltage has been brought to coincidence (for example position 23' of switch 25) or opposition (for example position 24' of switch 25) with that of the loop voltages in a 90° phase shifting circuit 18. At 18 there is shown a phase shifter of a known embodiment by means of which the phase of the voltage in the non-directional antenna 17 is shifted by 90° so that the antenna voltage is in phase with the voltage of loops 1 and 2. As an example of execution of such a phase shifter, reference is made to the switch box 18 of Fig. 2 of British Patent 761,267 and to the complete specification thereof. The search coil 16 of the resolver 15 is coupled with the rotatable pointer 19 on the screen 8 of the cathode ray tube 7 by mechanical means (in Fig. 2 represented by the circles 20 and 21 and the joining element 22) in such a way that the search coil 16 feeds a voltage to only one field coil if the pointer 19 is in a vertical direction. Thus the cosine and sine component of the voltage fed to the search coil 16, are conducted to the inputs of the receivers 3 and 4 in any position of the search coil. It will be seen that if the auxiliary voltage is in phase with the loop voltage, the resulting length of the luminous line 9 on the screen 8 is lengthened compared to the indication obtained without an auxiliary voltage, i.e. in the bearing position. The luminous line 9 is shortened if auxiliary and loop voltage are in phase opposition. The marks 23 and 24 for red and blue e.g. are on the rotatable pointer 19. The respective coloured positions of the switch 25 at the 90° phase shifting circuit 18 are accordingly marked with 23' and 24'.

After it has been realized that by application of a resolver which is coupled with the pointer for scale reading, a sense determination can be carried out by means of only two channels, a further advantage of the invention is obtained as follows: The resolver may be used in case of failure of the indication device as it allows aural bearings to be taken in the usual way with one channel of the twin-channel-system. By means of a switch the resolver is connected to the crossed loops in a way that is usually required for a direction finding resolver, i.e. each field coil is connected to one of the loops and the search coil to one of the two receivers. That provision allows to take bearings in the usual way with the minimum. Circuit elements which may be required, as e.g. a knob for compensation of quadrature effect in minimum direction finding, have additionally to be provided. Thus the visual D.F. has a double reserve for taking aural bearings.

For sense determination by extinction of the wrong side according to the further methods of the invention, the crossed loops, as shown in Fig. 3, consist of the two loops 31 and 32 the outputs of which may be means of a switch be connected as desired either to the inputs of the receivers 34 and 35 of the two channels 36 and 37 of the visual D.F. 38 or to the field coils 39 and 40 of the resolver. In the switch position at the left which is represented in the figure, the loops are directly connected with the amplifying channels. In the switch position at the right (dotted line) the loops are connected to the field coils.

The search coil 41 of the resolver is coupled with the pointer for scale reading 42 of the C.R. tube by mechanical means. In Fig. 3 this coupling is represented by the circles 43 and 44 and the joining element 45.

The ends of the search coil 41 are led to a switch 46 which by means of a bar 47 is mechanically connected with the switch 33. If the switch 33 is switched to the left position, the switch 46 is also switched to the left side, and in this position the search coil 41 of the resolver is open. If the switches 33 and 46 are switched to the right position so that the loops 31 and 32 are connected to the field coils 39 and 40, the search coil 41 is by means of the switch 46 connected to the input 34 of the receiver 36. Simultaneously the auxiliary aerial 48 is connected to the input 35 of the receiver 37 after it has in a phase shifting circuit 49 been made to agree in phase and amplitude with the voltage coming from the loops.

At operating the switch 33 to which the switch 46 is mechanically coupled, a third switch 50 also being mechanically coupled by means of a bar 51 to the two other switches, is operated and the output 52 of the amplifier 37 is connected as desired either to the second pair of deflecting plates 56 of the C.R. tube or to the Wehnelt-cylinder 57. The output 53 of the receiver 36 always remains connected with the first pair of deflecting plates 58 of the C.R. tube.

The three switches 33, 46 and 50 are by mechanical measures simultaneously operated by means of the switch "bearing-sense determination" which from the position "bearing" in which the indication is a luminous diameter 55, is switched to the position "sense determination" by which action the bearing indication becomes a luminous radius by extinction of the wrong side.

The principle of the further measure for sense determination by means of a special antenna combination is represented by Fig. 4. The crossed loops consisting of the two loops 61 and 62, are for sense determination arranged in a way that e.g. the loop 61 furnishes the figure-eight-pattern 61a whereas the loop 62 is connected to the auxiliary antenna 63 in order to furnish a cardioid 64.

In Fig. 5 this arrangement is represented in a schematic form. As an example the loop 62 of the two loops 61 and 62 is combined with the auxiliary antenna 63 in a cardioid switch and adjusting circuit 64 which combines the output of the loop 62 with the output of the auxiliary antenna 63 and adjusts the phase and amplitude of the combined antenna voltage to agree. From the cardioid switch and adjusting circuit 64 a circuit line is leading to the amplifying channel 66 which is connected with the cathode-ray tube. The channel 65 is connected with the loop 61 in the usual manner. The combination between the loop 62 and the auxiliary antenna 63 shown by way of example can also be used in a similar manner for the loop 61 and the auxiliary antenna 63. In that case the loop 62 would be connected directly with the corresponding receiver.

By means of a switch 68 which has the two positions "bearing" (74) and "sense determination" (73) the required connection by means of a bar or line 69 is effected in the circuit 64 while the bearing scale 70 and the scale for sense determination 71 are simultaneously changed over. This change-over may be realized by mechanical means, e.g. by application of shutters. Fig. 5 shows schematically the exchange of the scale for sense determination 71 and the bearing scale 70. The bearing scale 70 is shown as being located directly on the screen of the cathode ray tube, while the scale for sense determination 71 is arranged on a shutter swingable over the screen of the cathode ray tube, said shutter being swingable away from the cathode ray tube in the position 74 of the switch 68, shown by straight lines. When switch 68 is placed in its position 73, shown by dotted lines, scale 71 is placed in front of the cathode ray tube and bearing scale 70 is covered by the peripheral edge area of the shutter 70a.

The circuit for sense determination above explained for the example of two crossed loops, is applicable in an analogous way to other antenna combinations, e.g. to crossed pairs of Adcock antennas or spaced frame aerials. Instead of "loop" it has then only to be put e.g. "pair of Adcock antennas of the crossed arrangement of Adcock antennas."

I claim:

1. A direction finder for the determination of the direction from which an electromagnetic signal is being received, comprising a non-directional antenna, a first directional antenna, a second directional antenna, said second directional antenna being arranged substantially at right angles to said first directional antenna, two substantially equal receivers, a cathode-ray tube having two pairs of deflection plates arranged at substantially right angles to one another, a phase adjuster, said phase adjuster being connected to said non-directional antenna, and switching means, said switching means having at least two alternative positions, one position for "bearing" determination and a second position for "sense" determination, when in the "bearing" position said switching means connecting the outputs of said directional antennas to the inputs of said receivers, respectively, and the outputs of said receivers to said pairs of deflection plates, respectively, and when in the "sense" position said switching means suitably connecting said antennas to said receivers and further to the control elements of said cathode-ray tube.

2. A direction finder as claimed in claim 1, further comprising a resolver having two stationary elements arranged substantially at right angles to one another and one rotatable search element, a pointer, said pointer being rotatably mounted in close proximity to and centered with respect to the screen of said cathode-ray tube, a 360° scale, said scale being arranged close to and centered with respect to the screen of said cathode-ray tube and adapted to cooperate with said pointer, a mechanical coupling, said coupling extending between said pointer and said resolver search element and assuring substantially equal angular displacement of said pointer and said resolver search element, a phase reversing circuit, said circuit being fed by the signal derived from said non-directional antenna, and in which said switching means, when in the position for "sense" determination, connects the outputs of said directional antennas to the inputs of said receivers, respectively, the output of said non-directional antenna to the search element of said resolver, the outputs of the stationary elements of said resolver also to the inputs of said receivers, respectively, and the outputs of said receivers to said pairs of deflection plates, respectively.

3. A direction finder as claimed in claim 1, further comprising a resolver having two stationary elements arranged substantially at right angles to one another and one rotatable search element, a pointer, said pointer being rotatably mounted in close proximity to and centered with respect to the screen of said cathode-ray tube, a 360° scale, said scale being arranged close to and centered with respect to the screen of said cathode-ray tube and adapted to cooperate with said pointer, a mechanical coupling, said coupling extending between said pointer and said resolver search element and assuring substantially equal angular displacement of said pointer and said resolver search element, a beam intensity control element in said cathode-ray tube, and in which said switching means, when in the position for "sense" determination connects the outputs of said two directional antennas to the stationary elements of said resolver, respectively, the terminals of said resolver search element to the input of the first of said receivers, the output of said first receiver to one pair of said deflection plates, the signal of said non-directional antenna to the second of said receivers, and the output of said second receiver to said beam intensity control element of said cathode-ray tube.

4. A direction finder as claimed in claim 3, in which said scale is rotatably mounted with respect to the screen of said cathode-ray tube.

5. A direction finder as claimed in claim 4, in which said scale is connected to said pointer for equal angular displacement therewith.

6. A direction finder as claimed in claim 1, in which said switching means, when in the "sense" determination position, connects the first of said directional antennas to a first of said receivers, the output of said first receiver to the first of said pairs of deflection plates, the output of the second of said directional antennas to said second receiver, the output of said non-directional antenna to said second of said receivers, and the output of said second receiver to the second pair of said deflection plates.

7. A direction finder as claimed in claim 6, further comprising a cardioid switch, said cardioid switch being interposed between said second directional antenna, said non-directional antenna and the input to said second receiver.

8. A direction finder as claimed in claim 6, further comprising means for interchanging the connections between said first and said second directional antennas.

9. A direction finder as claimed in claim 6, further comprising a 360° scale extending over an annular range of 180° and means for arranging said scale in close proximity to and centered with respect to the screen of said cathode-ray tube when said switching means is in the "sense" determination position.

10. A direction finder as claimed in claim 6, further comprising means to place the minimum for the received directional pattern in a manner to eliminate the effect of interfering transmitters.

11. A direction finder as claimed in claim 6, further comprising means for "sense" determination by arranging the maximum of the directional pattern so that the lengthening of the indication line is used to increase the bearing determination accuracy.

12. A direction finder as claimed in claim 6, further comprising at least one re-radiator, said re-radiator being arranged to increase the bearing accuracy by causing an enlargement of the bearing scale in the required direction.

13. A direction finder as claimed in claim 1, further comprising a pointer, said pointer being mounted in close proximity to and centered with respect to the screen of said cathode-ray tube and a 360° scale cooperating with said pointer.

14. A direction finder as claimed in claim 13, in which said pointer is provided with a plurality of parallel lines, one of said lines extending along a diameter of the screen of said cathode-ray tube.

15. In a direction finder as claimed in claim 1, an automatic switch, said switching means having a third inoperative position, said switch controlling the consecutive use of first said calibration device and then said switching means to its operative positions.

16. In a direction finder as claimed in claim 1, a test voltage, a calibration switch, said calibration switch applying said test voltage to both receivers in parallel and the outputs of said receivers to said two pairs of deflection plates of said cathode-ray tube, respectively, means for adjusting the phase and amplitude of at least one of said two receivers, a blocking device, said switching mechanism having a third inoperative position, said blocking device preventing operation of said means for adjusting the phase and amplitude while the switching means is in either operative position.

17. In a direction finder as claimed in claim 16, first means for establishing a 45° line on the face of the cathode-ray tube during the calibration and second means for preventing operation of the bearing and sense indicators in response to a non-45° line indication of said first means.

18. A direction finder as claimed in claim 16, in which said second switch effects disappearance of the bearing indication.

19. A direction finder as claimed in claim 16, in which said second switch effects disappearance of the bearing scale.

20. A direction finder as claimed in claim 2, having switch means for enabling the resolver, on failure of the visual indication, to be utilised for taking bearings, said switch means being adapted to connect the stationary elements of said resolver to the loop aerials and the search element to one of the twin amplifying channels.

21. A direction finder as claimed in claim 2, having switch means for enabling the resolver, on failure of the visual indication, to be utilised for taking bearings, said switch means being adapted to connect the stationary elements of said resolver to the loop aerials and the search element to one of the twin amplifying channels.

References Cited in the file of this patent

UNITED STATES PATENTS

| | | |
|---|---|---|
| 2,282,402 | Hefele | May 12, 1942 |
| 2,361,436 | Taylor | Oct. 31, 1944 |
| 2,485,353 | Boosman et al. | Oct. 18, 1949 |